(12) United States Patent
Youm (10) Patent No.: US 7,170,245 B2
(45) Date of Patent: Jan. 30, 2007

(54) MOTOR POWER SUPPLY CONTROL APPARATUS

(75) Inventor: Jang-hyoun Youm, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/748,228

(22) Filed: Dec. 31, 2003

(65) Prior Publication Data

US 2004/0227479 A1 Nov. 18, 2004

(30) Foreign Application Priority Data

May 16, 2003 (KR) .................. 10-2003-0031125

(51) Int. Cl.
- *H02P 3/12* (2006.01)
- *H02P 3/14* (2006.01)
- *H02P 3/22* (2006.01)

(52) U.S. Cl. .............. 318/375; 318/376; 318/379; 318/380; 318/381; 318/362; 318/366; 318/268; 318/269; 318/727; 318/757; 318/759

(58) Field of Classification Search ............ 318/139, 318/801, 362, 727, 757, 375, 759, 779, 379, 318/380–381, 366, 268–269, 376; 323/908
See application file for complete search history.

(56) References Cited

U.S. PATENT DOCUMENTS

| | | | | |
|---|---|---|---|---|
| 4,039,914 A | * | 8/1977 | Steigerwald et al. | 318/375 |
| 5,241,255 A | * | 8/1993 | Oshima et al. | 318/801 |
| 5,291,106 A | * | 3/1994 | Murty et al. | 318/375 |
| 5,428,967 A | * | 7/1995 | Goto et al. | 62/230 |
| 5,471,125 A | * | 11/1995 | Wu | 318/803 |

(Continued)

FOREIGN PATENT DOCUMENTS

EP 1 162 726 A1 12/2001

(Continued)

OTHER PUBLICATIONS

Abstract of Korean Publication No. 100173211 published Oct. 28, 1998.

(Continued)

*Primary Examiner*—Lincoln Donovan
*Assistant Examiner*—Erick Glass
(74) *Attorney, Agent, or Firm*—Staas & Halsey LLP (57) ABSTRACT

A motor power supply including a DC supply part having a pair of supply terminals; an inverter having a pair of connection terminals respectively connected to the supply terminals thereof to receive DC power therefrom and to supply AC power to a motor, a breaking resistor and a control switching element disposed in parallel in an additional line connecting the pair of connection terminals to each other, a control switching element disposed with the breaking resistor in the additional line, a breaking switch disposed to one of the connection terminals and switched to either a normal position or a breaking position connecting the one connection terminal to a corresponding supply part or to the additional line, a speed detector detecting a motor speed and a control part controlling the breaking switch to switch to the breaking position and controlling the control switching element so that an on-off interval of the control switching element is controllable depending on the detected speed.

33 Claims, 11 Drawing Sheets

U.S. PATENT DOCUMENTS

| | | | | |
|---|---|---|---|---|
| 5,635,804 | A * | 6/1997 | Tanaka et al. | 318/139 |
| 5,710,494 | A * | 1/1998 | Paweletz | 318/366 |
| 5,814,956 | A * | 9/1998 | Kono et al. | 318/380 |
| 5,828,192 | A * | 10/1998 | Kawaguchi et al. | 318/139 |
| 6,051,953 | A * | 4/2000 | Vithayathil | 318/818 |
| 6,331,365 | B1 * | 12/2001 | King | 429/9 |
| 6,353,545 | B1 * | 3/2002 | Ueda | 363/40 |
| 6,373,207 | B1 * | 4/2002 | Yablonovitch | 318/362 |
| 6,452,357 | B1 * | 9/2002 | Jahkonen | 318/721 |
| 6,611,126 | B2 * | 8/2003 | Mizuno | 318/801 |
| 6,653,806 | B1 * | 11/2003 | Ono | 318/375 |
| 2001/0026141 | A1 * | 10/2001 | Hirata et al. | 318/727 |
| 2002/0051371 | A1 * | 5/2002 | Sekiguchi et al. | 363/40 |
| 2004/0222754 | A1 * | 11/2004 | Ochiai et al. | 318/105 |

FOREIGN PATENT DOCUMENTS

| | | |
|---|---|---|
| JP | 60-164512 * | 2/1987 |
| JP | 8-317678 | 11/1996 |
| JP | 11-206184 | 7/1999 |
| KR | 1990-0009630 | 10/1990 |
| KR | 1992-0007540 | 10/1991 |
| KR | 2001-102962 | 11/2001 |
| KR | 2002-1768 | 1/2002 |
| WO | WO 00/41293 | 7/2000 |
| WO | WO 00/55963 | 9/2000 |

OTHER PUBLICATIONS

Abstract of Japanese Publication No. 8-317678 published Nov. 29, 1996.

Abstract of Japanese Publication No. 11-206184 published Jul. 30, 1999.

Abstract of Korean Utility Model Laid-Out Publication No. 1989-0014904.

Abstract of Korean Utility Model Laid-Out Publication No. 1992-0013977.

* cited by examiner

MOTOR POWER SUPPLY CONTROL APPARATUS

CROSS-REFERENCE TO RELATED APPLICATION

This application claims the benefit of Korean Patent Application No. 2003-31125, filed May 16, 2003, in the Korean Intellectual Property Office, the disclosure of which is incorporated herein by reference.

BACKGROUND OF THE INVENTION

1. Field of the Invention

The present invention relates to a power supply for a motor, and more particularly, to a motor power supply device which reduces a redundant usage of components and provides a satisfactory value of resistance for motor speed of a brake circuit by sharing a dynamic braking circuit and an inverter. Whereby, size of products and manufacturing expense thereof can be reduced.

2. Description of the Related Art

Figure 1:
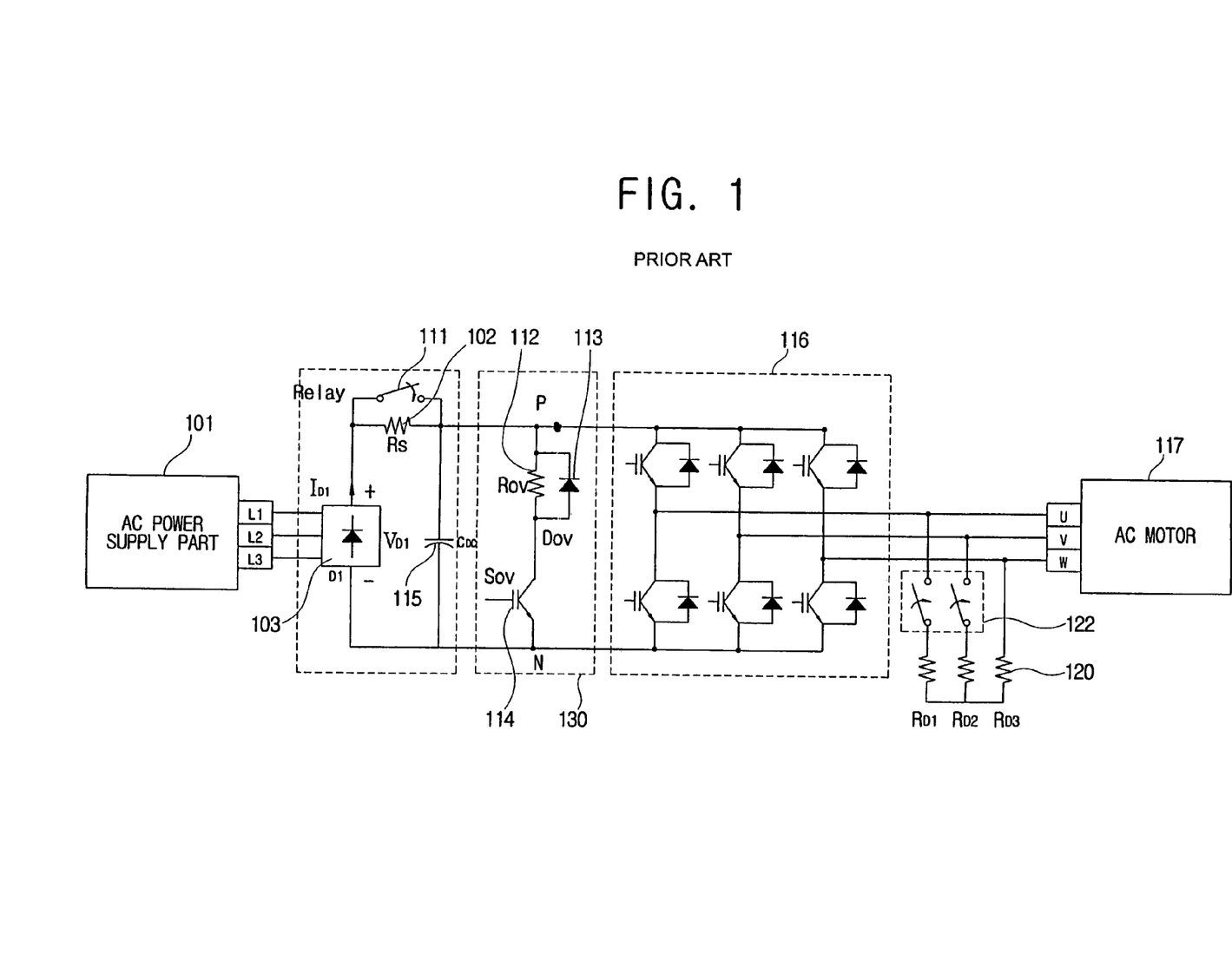
FIGS. 1 and 2 are circuit diagram of conventional motor power supply devices.

A three-phase motor has a coil wired in a triangle shape and a power supply device for the three-phase motor generates a three-phase voltage to operate the motor. As shown in FIG. 1, the three-phase motor power supply comprises a AC (Alternating Current) power supply part 101 supplying 110V/220V commercial AC power; a rectifier 103 rectifying the AC power generated from the AC power supply part 101 to a DC power; a capacitor 115 smoothing out the rectified voltage in the rectifier 103; an inverter 116 inverting the DC power from the capacitor 115 to a AC power having various frequencies and generating a three-phase voltage. The inverter 116 has a plural number of transistors turned on/off depending on a PWM (Pulse Width Modulation) control signal, and diodes connected in parallel with each of the plural number of transistors. The three-phase motor power supply further comprises a microprocessor (not shown) turning on/off the transistors of the inverter 116, responding to the PWM control signal and modulating power frequencies to control a rotation speed of an AC motor 117.

A motor power supply device generally comprises an inrush-current protection circuit formed to consume inrush-current flowing from an inrush-current resistor 102 to the capacitor 115 by turning off a relay 111 for inrush-current protection when an initial power is applied; an over voltage protection circuit 130, connected across the inverter 116, protecting the capacitor 115 from an over-voltage condition and including an over voltage protection resistor 112 and a diode 113 connected, in parallel, in series with a control switching element 114; and a dynamic braking circuit shortening power input terminals of the AC motor 117.

The dynamic braking circuit has dynamic braking resistors 120 connected with a braking relay 122 across each pair of power input terminals U and V; U and W of the AC motor 117.

Figure 2:
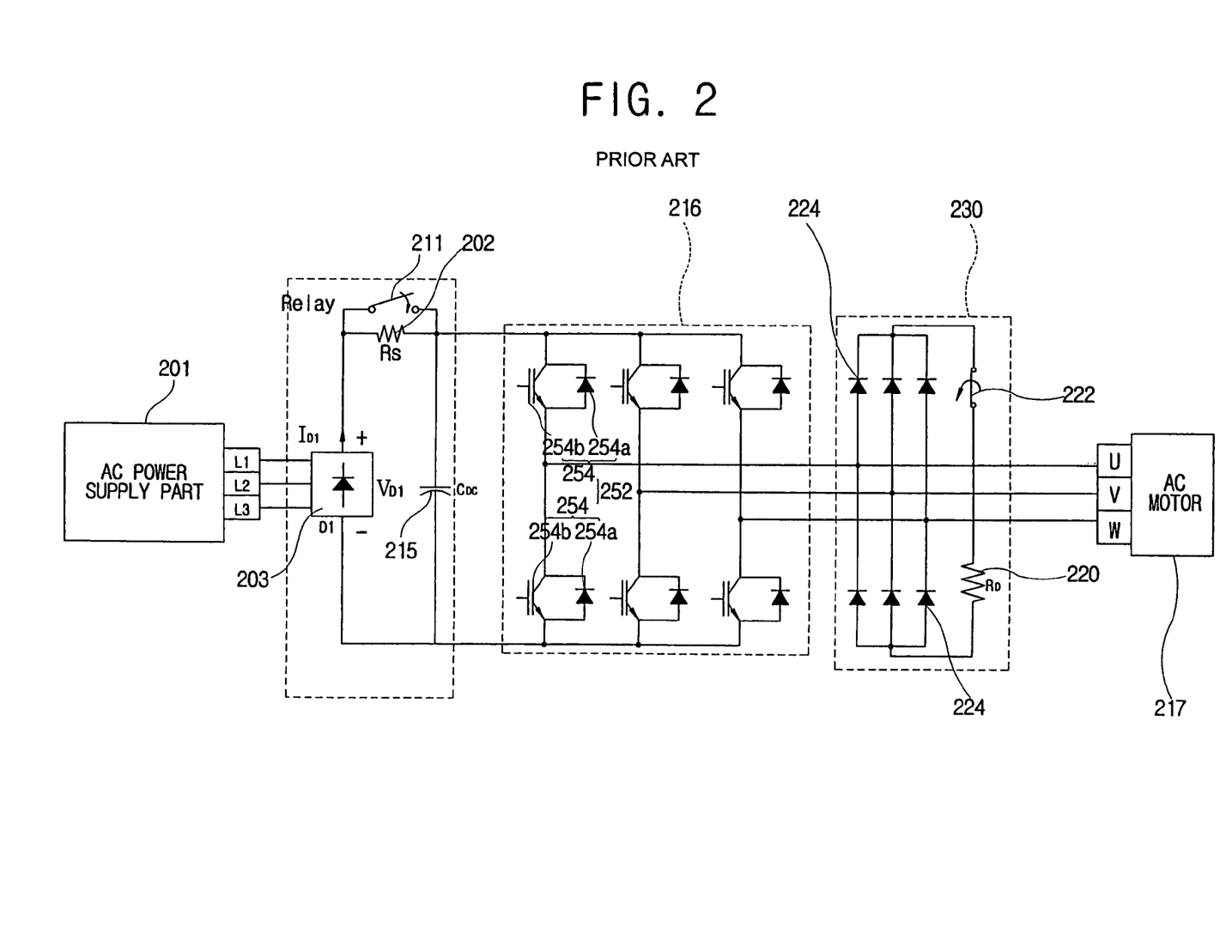

As shown in FIG. 2, the three-phase motor power supply comprises a AC (Alternating Current) power supply part 201 supplying 110V/220V commercial AC power; a rectifier 203 rectifying the AC power generated from the AC power supply part 201 to a DC power; a capacitor 215 smoothing out the rectified voltage in the rectifier 203; an inverter 216 inverting the DC power from the capacitor 215 to a AC power having various frequencies and generating a three-phase voltage. The inverter 216 has a plural number of transistors 254b turned on/off depending on a PWM (Pulse Width Modulation) control signal, and diodes connected in parallel with each of the plural number of transistors 254b. The three-phase motor power supply further comprises a microprocessor (not shown) turning on/off the transistors 254b of the inverter 216, responding to the PWM control signal and modulating power frequencies to control a rotation speed of an AC motor 217.

A motor power supply device generally comprises an inrush-current protection circuit formed to consume inrush-current flowing from an inrush-current resistor 202 to the capacitor 215 by turning off a relay 211 for inrush-current protection when an initial power is applied; and a dynamic braking circuit 230 to brake the AC motor 217.

The dynamic braking circuit, as shown in FIG. 2, having pairs of dynamic braking diodes 224, respectively, connected to each of the power input terminals of the AC motor 217. Further the respective dynamic braking diodes 224 may be parallel connected to a dynamic braking resistor 220 and a braking relay 222.

Further, as shown in FIG. 1 or 2, the braking relay 122 or 222 stays in an off state when the AC motor 117 or 217 is in a driving mode, and the braking relay 122 or 222 is turned on when the motor 117 or 217 is about to stop or after the AC motor 117 or 217 is stopped. When the braking relay 122 or 222 is activated, the AC motor 117 or 217 stops suddenly or prevents the AC motor 117 or 217 from rotating due to an external force.

However, the dynamic braking circuit only operates while the AC motor 117 or 217 is stopping or after the motor 117 or 217 is stopped in the conventional dynamic braking circuit. The dynamic braking circuit does not operate while the AC motor 117 or 217 is regularly in the driving mode when power is supplied and the capacitor 115 or 215 is charged with the power. However, the dynamic braking circuit is independently provided with components to perform an operation as required, resulting in an increase in a size of an entire circuit and an increase in an expense for a manufacture thereof.

A size of the dynamic braking resistor 120 or 220 depends on amounts of current flowing through the shortcircuited AC motor 117 or 217, and the amounts of the currents therein depend on a preceding speed when the AC motor 117 or 217 is about to stop. Thus, a resistance value of the dynamic braking resistor 120 or 220 is increased as the AC motor 117 or 217 rotating at high speed tries to stop. The resistance value of the dynamic braking resistor 120 or 220 is decreased as the motor rotating at slow speed tries to stop. Therefore, a motor speed may determine the resistance value of the dynamic braking resistor 120 or 220. However, the conventional AC motor 117 or 217 was not designed in consideration of such a configuration.

Thus, the present invention provides a motor power supply in which a number of elements of a dynamic braking circuit and an inverter share a diode and also reduce a size of products and a manufacturing expense thereof. Further, with an effect that a value of resistance in a braking mode is variable depending on a motor speed, a satisfactory value of resistance for a braking circuit is provided.

SUMMARY OF THE INVENTION

The above described aspects are achieved by providing a motor power supply comprising a DC power supply part having a pair of power supply parts; a pair of connection terminals connected to the pair of power supply parts of each DC power supply part; and an inverter absorbing the DC power from the DC power supply part and supplies an AC power to the motor. The motor power supply further comprises a braking resistor disposed inside of additional lines interconnecting each of the connection terminals; a control switching element having a series connection with the braking resistor; a braking switch engaging with one of the connection terminals and switched to either a normal position connecting the one connection terminal to a corresponding power supply terminal or a braking position connecting the connection terminal to a corresponding additional line; a motor speed detector detecting a motor speed; a control part controlling the braking switch to switch to the braking position, controlling an on-off interval of the control switching element depending on the motor speed detected by the motor speed detector.

Further, the motor power supply according to the present invention further comprises an over voltage protection resistor having a first side connected between the braking resistor and the control switching element and a second side connected to one of the connection terminals to connect the over voltage protection resistor and the control switching element connected in series; a capacitor disposed inside of the DC power supply part, applying the voltage generated from the motor; an over voltage detector detecting an over voltage applied on opposite sides of the capacitor. The control part may control the braking switch to switch to the normal position when the over voltage detector detects the over voltage on the opposite sides of the capacitor and to turn on the control switching element resulting in the motor power supply operating the over voltage protection. The control switching element may be shared by the over voltage protection and the dynamic braking.

The motor power supply further comprises a diode connected, in parallel, with an over voltage protection resistor, and the diode may have a cathode connected to the connection terminal of the inverter allowing a current to flow through the over voltage protection resistor when the control switching element is turned off.

Further, the control part controls the braking switch to switch to the normal position when the motor is in a driving mode to activate the motor in a different mode such as a control mode, an over voltage mode, and a dynamic braking mode, respectively, corresponding to a switching position of the braking switch.

The braking resistor may have a smaller resistance value than that of the over voltage protection resistor so that a majority of the currents flow through the break resistor when the motor is in a dynamic braking mode.

The braking switch may comprise a relay including a first contact point where the braking switch switches to the normal position; and a second contact point where the braking switch switches to the braking position, and having the first and the second contact points switchable therebetween.

Additional aspects and/or advantages of the invention will be set forth in part in the description which follows and, in part, will be obvious from the description, or may be learned by practice of the invention.

The above and/or other aspects of the present invention are achieved by providing a motor power supply including a DC power supply part having a pair of power supply terminals, and an inverter having a pair of connection terminals, respectively, connected to the pair of power supply terminals of the DC power supply part to receive DC power from the DC power supply part and to supply AC power to a motor, and the motor power supply comprising a braking resistor disposed in an additional line connecting the pair of connection terminals to each other a control switching element disposed with the braking resistor, in parallel, in the additional line a braking switch disposed to one of the pair of connection terminals and switched to either a normal position connecting the one connection terminal to a corresponding power supply part, or a braking position connecting the one connection terminal to the additional line a motor speed detector detecting a speed of the motor and a control part controlling the braking switch to be switched to the braking position and controlling the control switching element so that an on-off interval of the control switching element is controllable depending on the detected speed by the motor speed detector.

According to an aspect, the motor power supply further comprises an over voltage protection resistor having a first side connected between the braking resistor and the control switching element, and a second side connected to one of the connection terminals to place in series with the control switching element; a capacitor disposed in the DC power supply part and receiving a voltage from the motor; and an over voltage detector detecting an over voltage passed to opposite ends of the capacitor, and the control part controls the braking switch to switch to the normal position and turns the control switching element on when the over voltage detector detects the over voltage on the opposite ends of the capacitor.

According to an aspect, the motor power supply further comprises a diode disposed, in parallel, with an over voltage protection resistor, having a cathode connected to the connection terminal of the inverter to which the over voltage protection resistor is connected.

According to an aspect, the control part controls the braking switch to switch to the normal position when the motor is in the driving mode.

According to an aspect, the braking resistor is smaller in a resistance value than that of the over voltage protection resistor.

According to an aspect of the invention, the braking switch is a relay having a first contact point where the braking switch switches to the normal position and a second contact point where the braking switch switches to the braking position.

BRIEF DESCRIPTION OF THE DRAWINGS

These and/or other aspects and advantages of the present invention will become apparent and more readily appreciated from the following description of the embodiment, taken in conjunction with the accompany drawings of which.

DETAILED DESCRIPTION OF THE PREFERRED EMBODIMENT

Reference will now made in detail to the embodiment of the present invention, examples of which are illustrated in the accompanying drawings, wherein like reference numerals refer to the like elements throughout. The embodiment is described below in order to explain the present invention by referring to the figures.

Figure 3A:
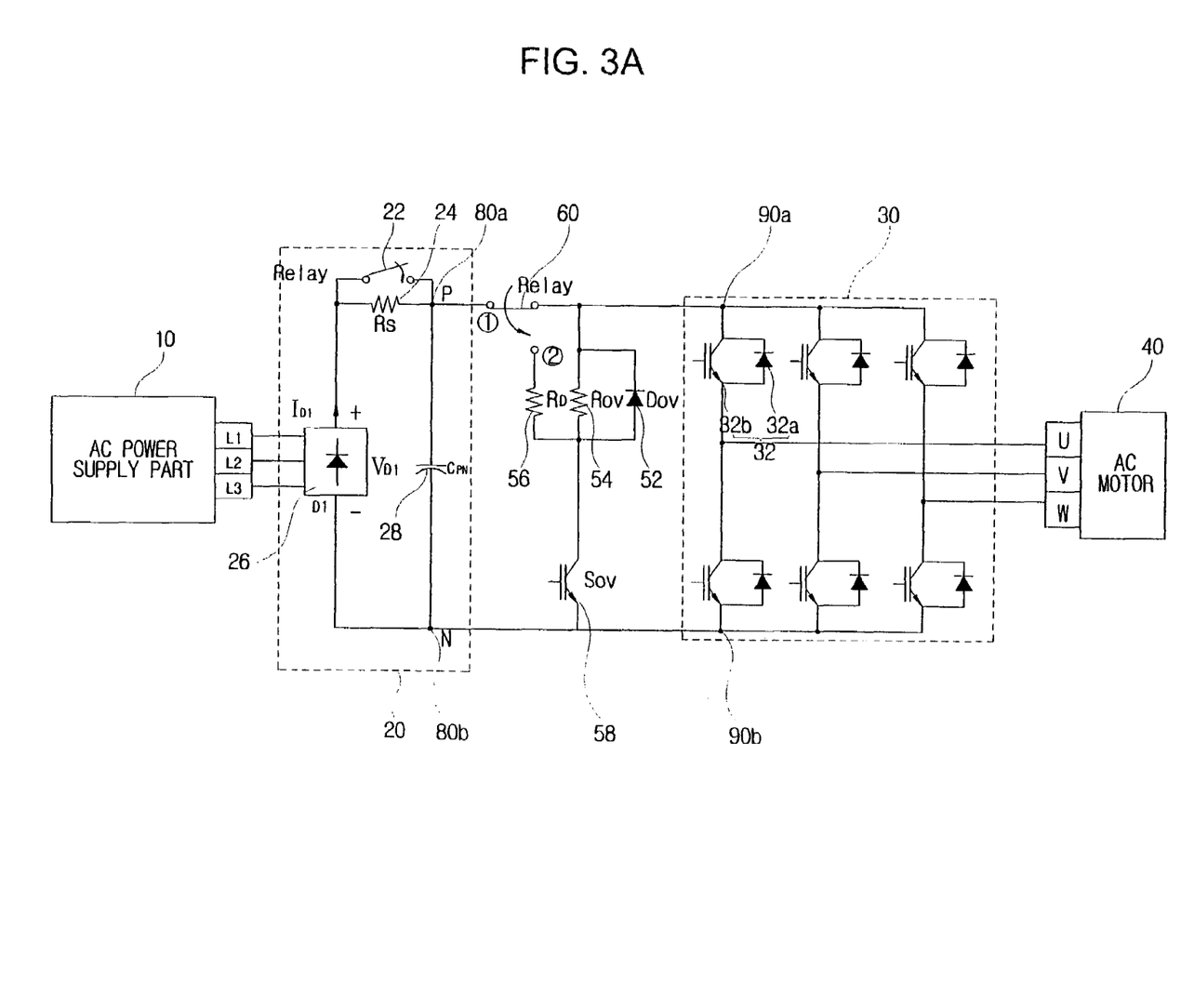
FIG. 3A is a circuit diagram of a motor power supply device according to an embodiment of the present invention.

FIG. 3A illustrates a circuit of a motor power supply according to an embodiment of the present invention. As illustrated in FIG. 3A, the motor power supply comprises a DC power supply part 20 receiving AC power from an AC power supply part 10 and supplying DC power through a pair of power supply terminals 80a and 80b; and an inverter 30 receiving the DC power from the DC power supply part 20 through a pair of connection terminals 90a and 90b which are, respectively, connected to the pair of power supply terminals 80a and 80b and converting the DC power into AC power having various frequencies so as to supply a three-phase voltage to an AC motor 40.

The motor power supply comprises a braking resistor 56 and a control switching element 58 serially disposed in an additional line connectable with the pair of power supply terminals 80a and 80b of the inverter 30, having series connection with the connection terminal 90 of the inverter 30 each other; a braking switch 60 to connection terminal 90A the connection terminal 90a to the respective power supply part 80a or to the additional line; an over voltage protection resistor 54 connected in series with the control switching element 58, having a side connected to the connection terminal 90a of the inverter 30 and a remaining side connected between the braking resistor 56 and the control switching element 58; a diode 52 connected, in parallel, with the over voltage protection resistor 54, having a cathode connected to the connection terminal 90a of the inverter 30 to which the over voltage protection resistor 54 is connected; a motor speed detector 99 (see FIG. 3B) detecting a speed the of AC motor 40; and a control part (see FIG. 3B) controlling, the control switching element 58 and the braking switch 60.

The DC power supply part 20 includes a rectifier 26 rectifying the AC power supplied from the AC power supply part 10, and a capacitor 28 smoothing out the rectified AC power from the rectifier 26. An inrush-current protection circuit is provided inside of the DC power supply part 20 to prevent a large amount of inrush-current from being generated to charge the capacitor 28 on the initial power supply.

The inrush-current protection circuit has an inrush-current protection resistor 24 consuming a current inrushing into the capacitor 28, transforming the inrush-current into a form of heat energy; and an inrush-current protection relay 22 turned off so that a rectified voltage in the rectifier 26 is transferable to the capacitor 28 by passing through the inrush-current protection resistor 24, or turned on so that the rectified voltage is transferable to the capacitor 28 without passing through the inrush-current protection resistor 24.

The control part (to be described later) prevents the capacitor 28 from being damaged by turning off the inrush-current protection relay 22 so that the inrush-current may be consumed by the inrush-current protection resistor 24 when the power is initially applied from the AC power supply part 10. Further, a voltage ($V_{pn}$) between opposite ends of the capacitor 28 increases slowly as the capacitor 28 charges.

The inverter 30 has several inverting elements 32 formed in a pair of a transistor 32b and a diode 32a in a parallel connection thereof. Further, each power input terminal U, V and W of the AC motor 40 is, respectively, connected between corresponding pairs of the inverting elements 32 and supplied a three-phase voltage by the inverter 30 so as to input the three-phase voltage from the inverter 30.

Similar to a MOS Transistor or a Field Effect Transistor, the control switching element 58 is switchable depending on an input signal on a gate, and the control part controls the input signal to the control switching element 58 so as to turn on/off the control switching element 58, and changing an interval between a turning on and a turning off of the control switching element 58.

Figure 3B:
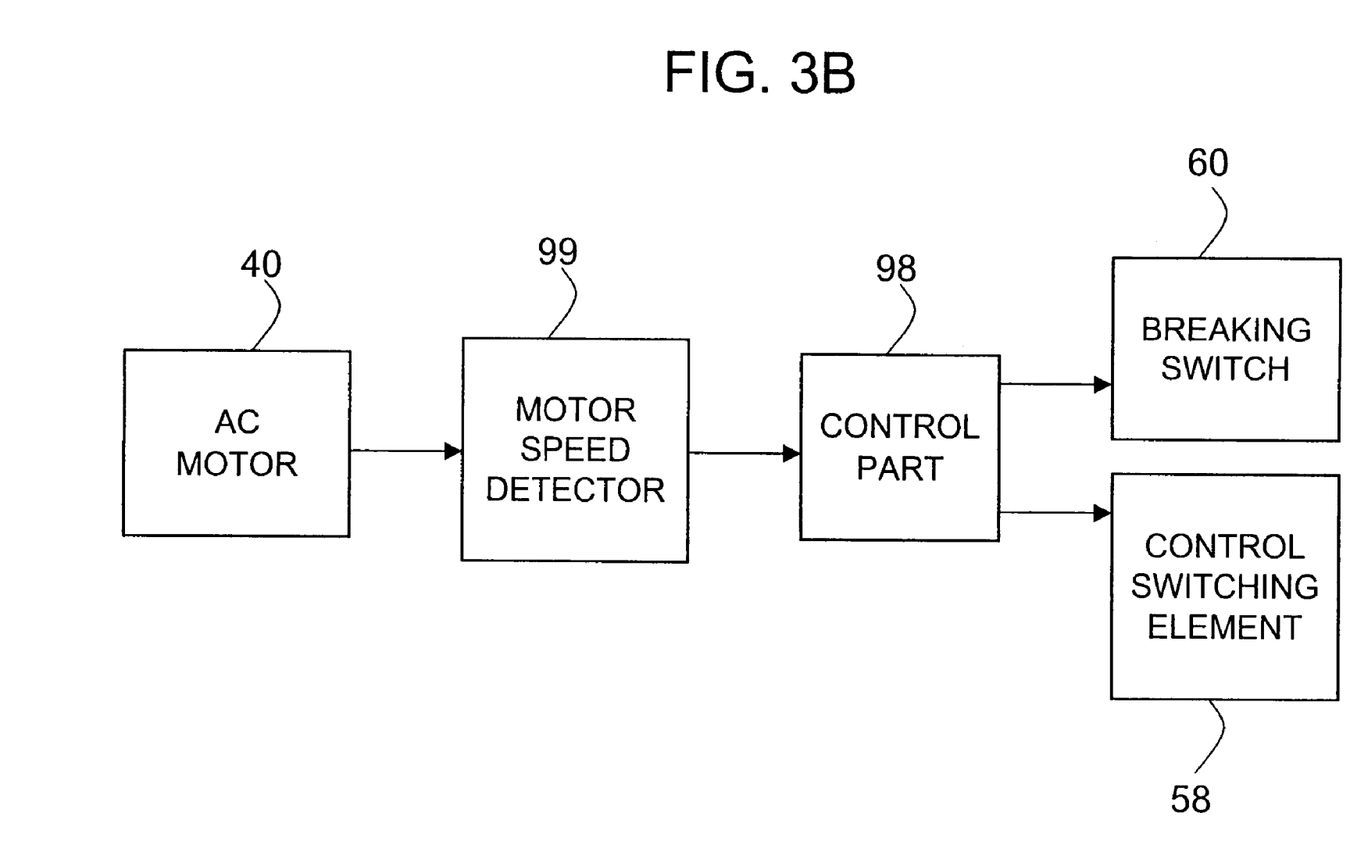
FIG. 3B is a block diagram of a motor power supply device according to the embodiment of the present invention.

The motor speed detector 99 may be an encoder coding an angle of a rotation position of the AC motor 40 and calculating a position and a speed of the AC motor 40 based on an encoded signal. The encoder may provide the control part with information of the speed and the angle of the rotation position of the AC motor 40.

The braking switch 60 may be a relay having a first contact point ① and a second contact point ② through which the connection terminal 90a of the inverter 30 is selectively connectable to one of the power supply part 80a (the normal position) and the additional line (i.e., the braking position).

Figure 4:
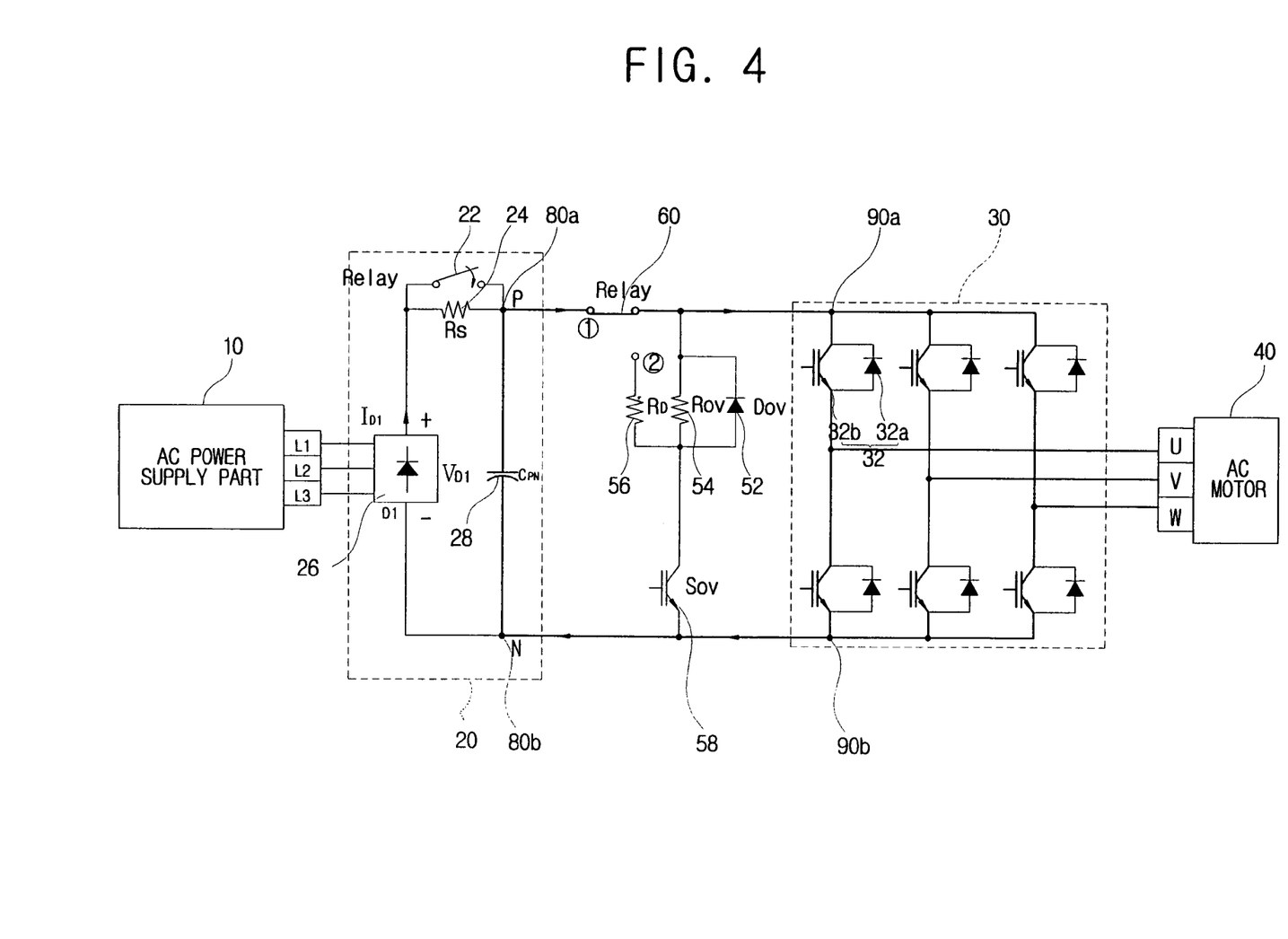
FIG. 4 is a circuit diagram of currents flow when the motor in FIG. 3 is in a control mode.

After the initial power is applied and a predetermined time passes, opposite ends of the capacitor 28 are completely charged and then a motor activating signal is generated by external operations. Once the motor activating signal is generated, the control part switches the braking switch 60 to connect to the first contact point ① (i.e., the normal position). Further, as shown in FIG. 4, the voltage charging the capacitor 28 is supplied to the inverter 30 and the inverter 30 transforms the applied DC power to a three-phase AC voltage for the AC motor 40.

While the AC motor 40 is in a driving mode in the above process, however, rotational energy stored by the AC motor 40 regenerates in the capacitor 28 through the inverter 30. Such a regenerative voltage increases the voltage ($V_{pn}$) between the opposite ends of the capacitors 28.

Figure 5:
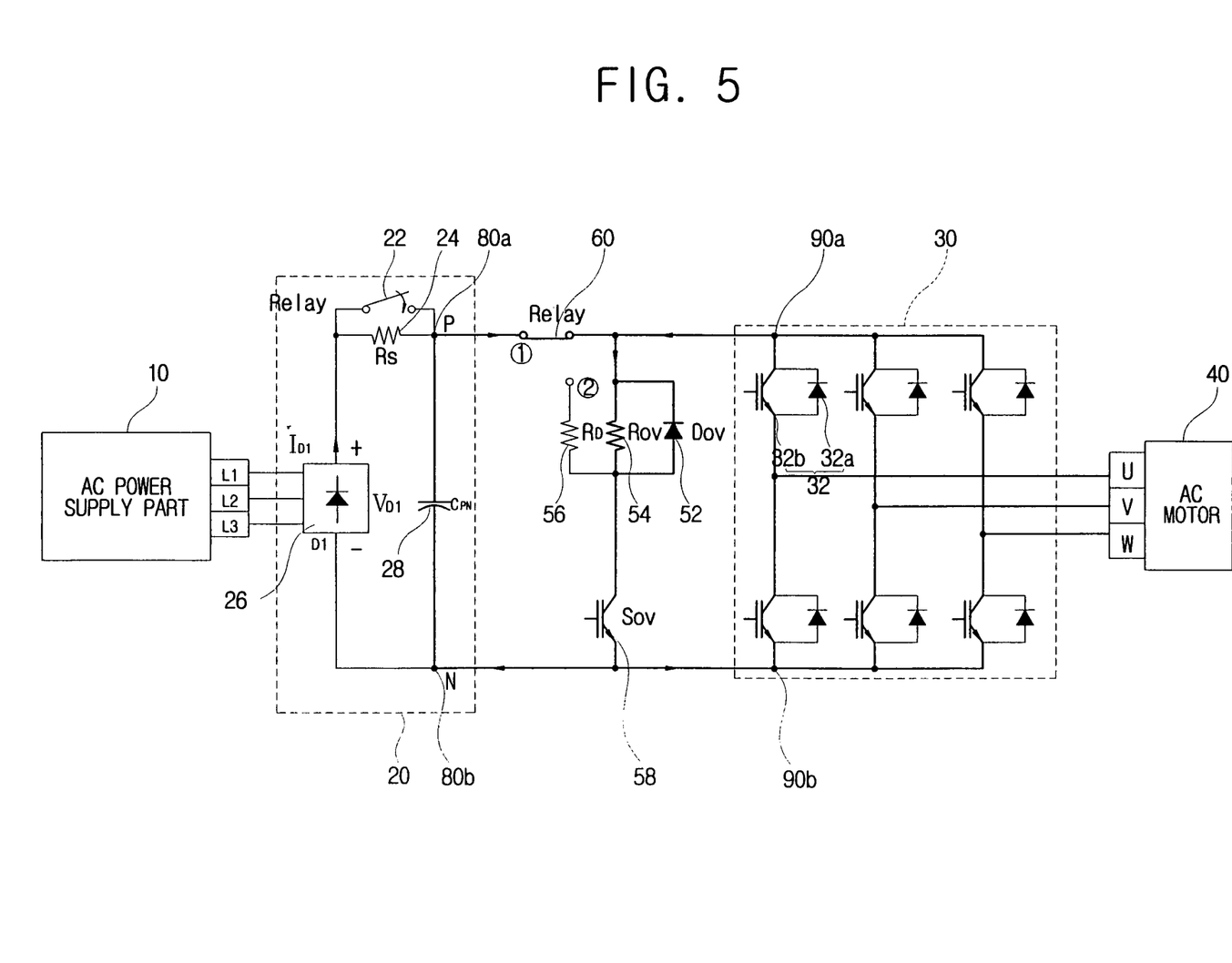
FIG. 5 is a circuit diagram of currents flow when the motor in FIG. 3 is in an over voltage protection mode.

When an over voltage detector (not shown) detects an over-voltage condition on the opposite ends of the capacitor 29, the control part keeps the braking switch 60 connected to the first contact point ①, turning on the control switching element 58. Further, the over-voltage is transformed to heat and consumed by the over voltage protection resistor 54 preventing the capacitor 28 from being damaged, and if there is no over-voltage detected, the control part turns off the control switching element 58 so that the current bypass the over voltage protection resistor 54 and flows through the diode 52 (refer to FIG. 5).

Figure 6A:
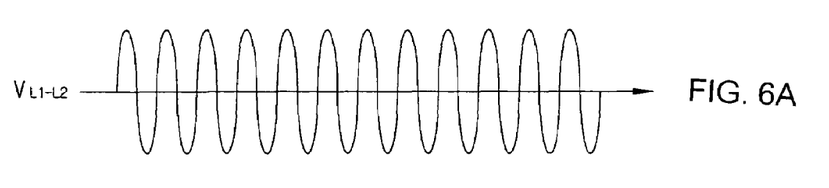
FIGS. 6A–6C illustrate waveforms of a current and a voltage of each contact point of the motor power supply device.
Figure 6B:
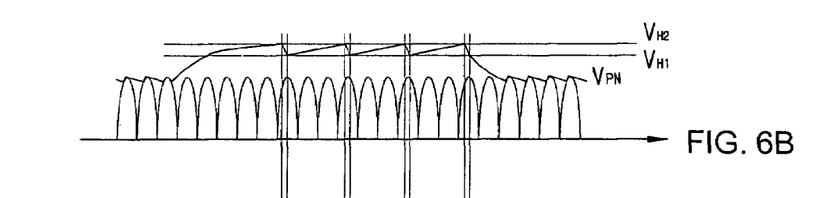
Figure 6C:
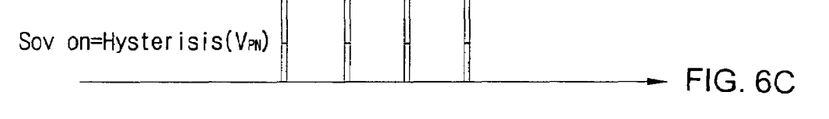

As shown in FIGS. 6A–6C, if the voltage between the opposite ends of the capacitor 28 reaches a maximum limit of over voltage $V_{H2}$ while an over voltage area is in a hysterisis range $V_{H1}$–$V_{H2}$, the control part keeps the braking switch 60 connected to the first contact point ① and turns the control switching element 58 on to allow the over voltage to be transformed to heat and consumed by the over voltage protection resistor 54. Thus, the voltage between the opposite ends of the capacitor 28 is decreased.

The control part controls the control switching element 58 so that a variation of the voltage applied to the opposite ends of the capacitor 28 is limitable within the over voltage range (i.e., hysterisis range, $V_{H1}$–$V_{H2}$) (refer to FIGS. 6A–6C), and operates the control switching element 58 within the hysterisis range $V_{H1}$–$V_{H2}$ to decrease a malfunctioning of the control switching element 58 due to noises.

Figure 7:
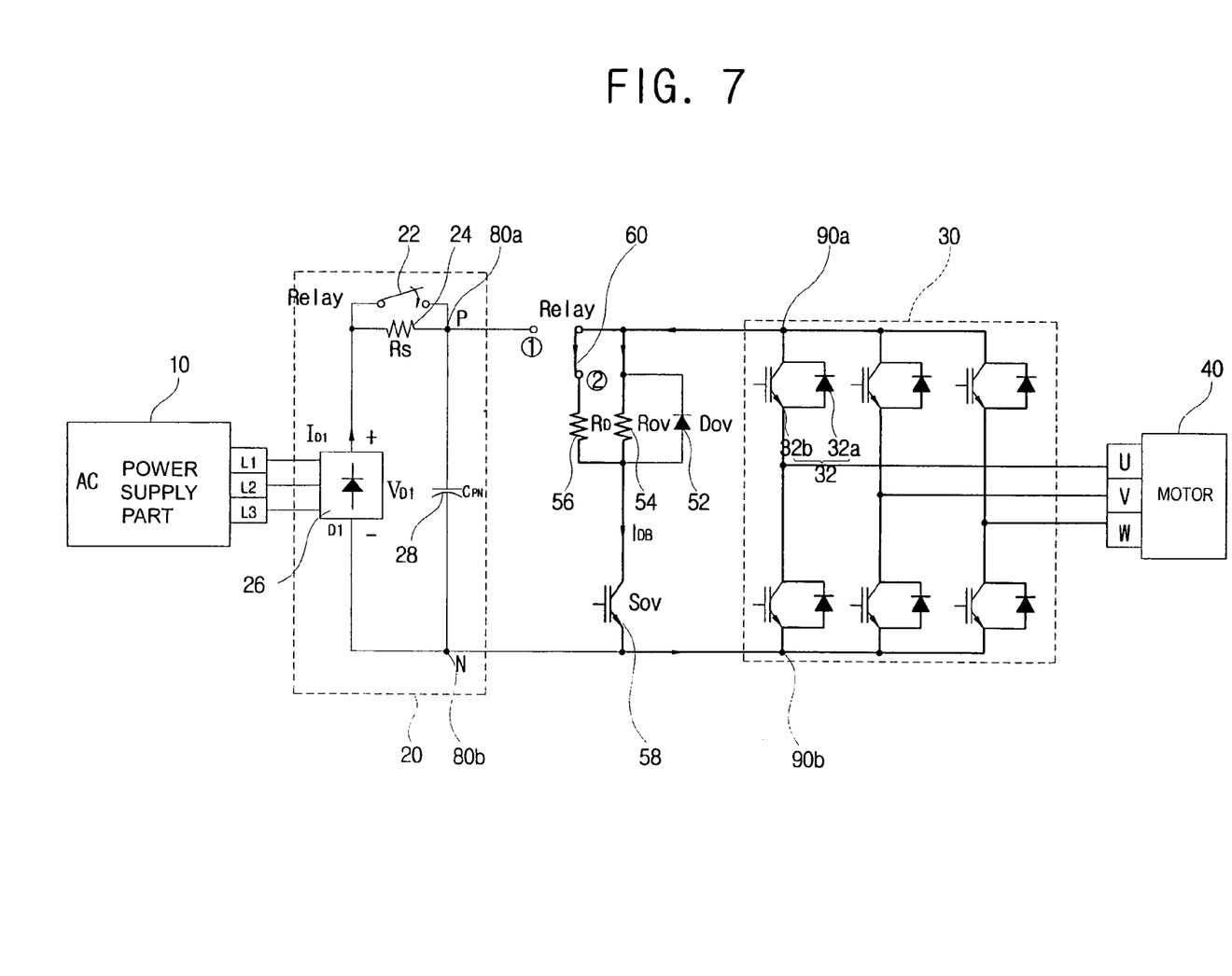
FIG. 7 is a circuit diagram of currents flow when the motor in FIG. 3 is in a dynamic braking mode.

The control part connects the braking switch 60 to the second contact point ② and turns off the transistor 32b of the inverter 30 when the AC motor 40 makes a sudden stop or the AC motor 40 stops driving when power is not applied. The control part enters control signals into a gate of the control switching element 58, and the control signal controls the on-off interval of the control switching element 58 depending on a result of the motor speed detector 99.

Thus, a portion of the current flowing in winding wires around the AC motor 40 flows into the AC motor 40 through the diode 32a of the inverter 30 and the braking resistor 56 resulting in shortening of the power connection terminals, and the braking resistor 56 consumes the current transformed into the heat. A further portion of the current flowing in the winding wires around the AC motor 40, flows in the over voltage protection resistor 54 connected with the braking resistor 56, in parallel, but the over voltage protection resistor 54 generally has a larger resistance value than that of the braking resistor 56, consequently the currents mostly flow through the braking resistor 56, and thereby prevents the AC motor 40 from being damaged and from rotating by external forces to enable the AC motor 40 to make a quick stop.

Figure 8A:
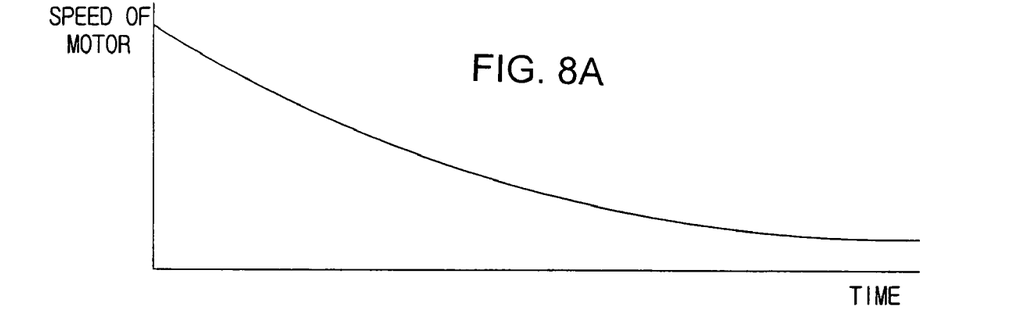
FIGS. 8A–8B are graphs illustrating a duty ratio of a control switching element and dynamic braking current $I_{DB}$ depending on a motor speed.
Figure 8B:
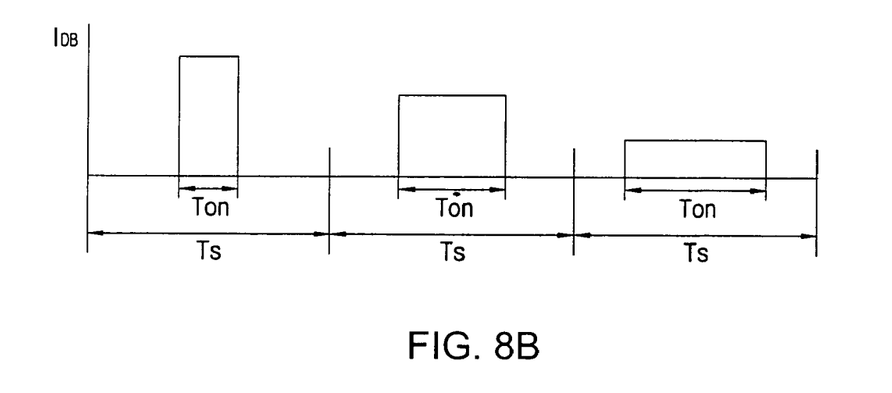
Figure 8C:
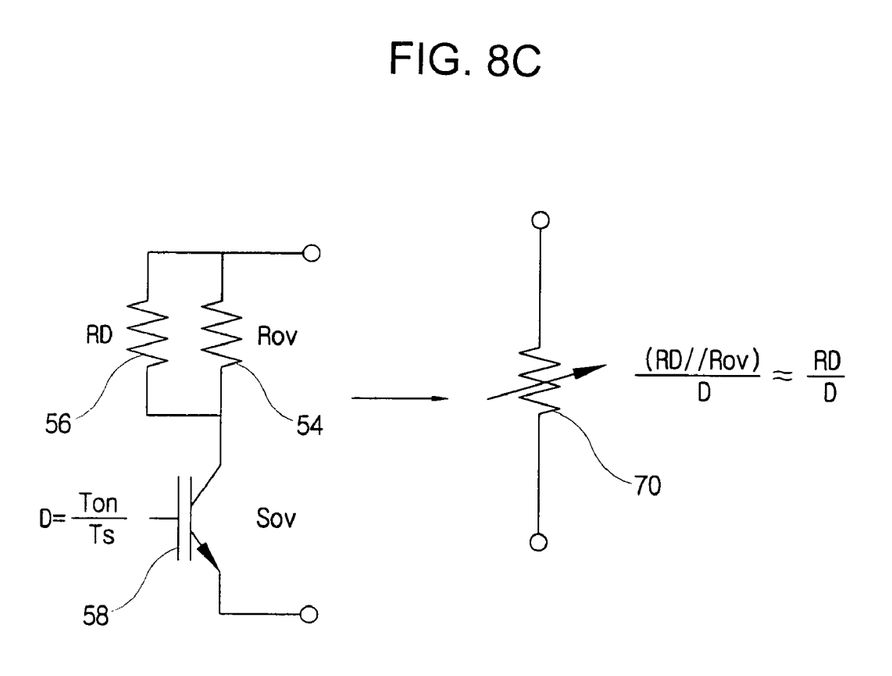
FIG. 8C illustrates an equivalent circuit of a control switching element duty ratio.
Figure 9:
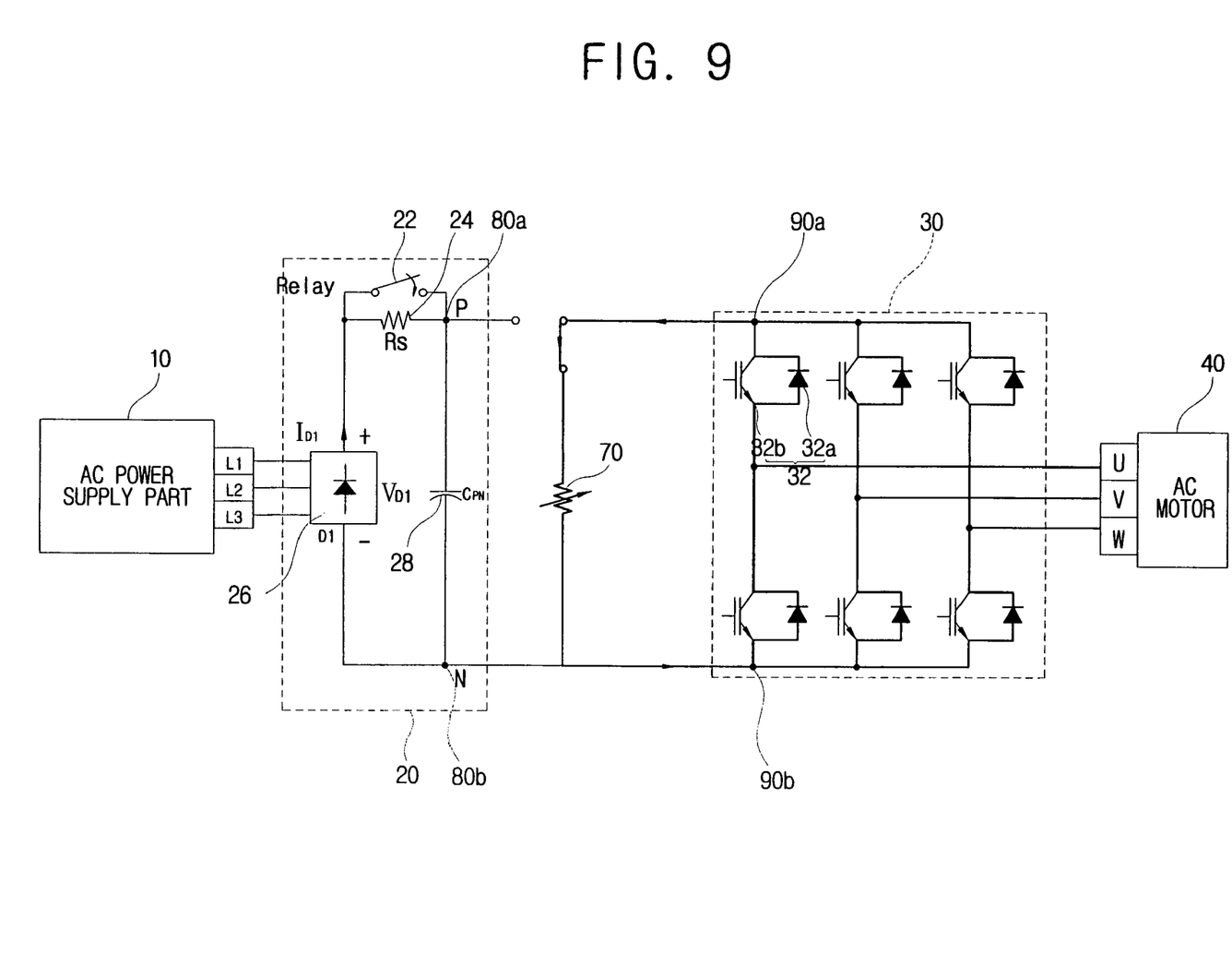
FIG. 9 shows a simplified equivalent circuit diagram of FIG. 3.

The control part controls the on-off interval of the control switching element 58 and has a same effect as a variable resistor 70 (refer to FIGS. 8C and 9).

As shown in FIGS. 8A–8B, the faster the AC motor 40 rotates, the shorter a turn-on time ($T_{on}$) of the control switching element 58, and the slower the AC motor 40 rotates, the longer the turn-on time ($T_{on}$) of the control switching element 58. Hence, when a speed of the AC motor 40 increases, a duty ratio ($D=T_{on}/T_s$) of the control switching element 58 decreases, and when the speed of the AC motor 40 decreases, the duty ratio ($D=T_{on}/T_s$) increases.

The current flowing in the winding wires around the AC motor 40 flows through the braking resistor 56, the over voltage protection resistor 54, and the control switching element 58. Since the duty ratio of the control switching element 58 varies depending on the speed of the motor 40, the braking resistor 56, the over voltage protection resistor 54, and the control switching element 58 operates together like that of a single variable resistor 70, as shown in FIG. 8C.

A value of the variable resistance is a same as a value of a compound resistance ($R_D \| R_{OV}$) formed by a parallel connection between the braking resistor 56 and the over voltage protection resistor 54 divided by the duty ratio (D) of the control switching element 58. A value of the braking resistance ($R_D$) is comparatively smaller than a value of the over voltage protection resistance ($R_{OV}$), thus the value of the compound resistance ($R_D \| R_{OV}$) is close to the value of the braking resistance ($R_D$). Therefore, the value of the variable resistance is similar to a ratio of the value of the braking resistance ($R_D$) to the duty ratio (D). When the speed of the AC motor 40 increases, the duty ratio (D) decreases to increase the value of the compound resistance, and when the speed of the AC motor 40 decreases, the duty ratio (D) increases to decrease the value of the compound resistance.

Thus, if the AC motor 40 makes a sudden stop or stops driving when power is not applied, the speed of the AC motor 40 becomes a variable to setup a satisfactory value of the braking resistor 56, and specifies the value if necessary to reduce a size of a PCB (Printed Circuit Board) and a size of product.

The composition of circuits may be simple since the control switching element 58 is useable for the over voltage protection and further useable for braking operations.

In the above-described embodiments, the motor power supply supplies power for a three-phase motor, but as can be appreciated by one of ordinary skilled in the art, a number of phases of the motor is not limited three but may vary by changing a structure of the inverter 30.

With this configuration, a motor power supply is provided in which a number of elements is reduced by sharing a diode between a dynamic braking circuit and an inverter and, further, a size of a product and a manufacturing expense thereof are reduced. Further, with an effect that a value of resistance in a braking mode is variable depending on the motor speed, a satisfactory value of resistance for a braking circuit is provided.

Although an embodiment of the present invention has been shown and described, it will be appreciated by those skilled in the art that changes may be made in the embodiment without departing from the principles and spirit of the invention, the scope of which is defined in the appended claims and their equivalents.

The invention claimed is:

1. A motor power supply control apparatus including a DC power supply part having a pair of power supply terminals, and an inverter having a pair of connection terminals connected to each other by an additional line, respectively, connected to the pair of power supply terminals of the DC power supply part to receive DC power from the DC power supply part and to supply AC power to a motor, the motor power supply control apparatus comprising:

a power supply line connecting the pair of connection terminals to each other;

a braking resistor disposed in the power supply line connecting the pair of connection terminals to each other;

a control switching element disposed in series with the braking resistor in the additional line;

a braking switch disposed to one of the connection terminals and switching to either a normal position connecting the one of the connection terminals to a corresponding power supply terminal, or a braking position connecting the one of the connection terminals to the additional line;

a motor speed detector detecting a speed of the motor;

a control part controlling the braking switch to switch to the braking position and controlling the control switching element so that an on-off interval of the control switching element is controllable depending on the speed detected by the motor speed detector, when the AC motor is in a dynamic braking mode; and an over voltage protection resistor having a side connected between the braking resistor and the control switching element, and a remaining side connected to the one connection terminal to be placed in series with the control switching element.

2. The motor power supply control apparatus according to claim 1, further comprising:

a capacitor disposed in the DC power supply part and receiving a voltage from the AC motor; and an over voltage detector detecting an over voltage across opposite ends of the capacitor, and wherein the control part controls the braking switch to switch to the normal position and turns the control switching element on when the over voltage detector detects the over voltage across the opposite ends of the capacitor.

3. The motor power supply control apparatus according to claim 2, further comprising:
a diode disposed, in parallel, with the over voltage protection resistor, having a cathode connected to the one connection terminal of the inverter to which the over voltage protection resistor is connected.

4. The motor power supply control apparatus according to claim 1, wherein the control part controls the braking switch to switch to the normal position when the motor is in a driving mode.

5. The motor power supply control apparatus according to claim 2, wherein a resistance value of the braking resistor is smaller than that of the over voltage protection resistor.

6. The motor power supply control apparatus according to claim 3, wherein a resistance value of the braking resistor is smaller than that of the over voltage protection resistor.

7. The motor power supply control apparatus according to claim 1, wherein the braking switch is a relay having a first contact point where the braking switch switches to the normal position and a second contact point where the braking switch switches to the braking position.

8. The motor power supply control apparatus according to claim 2, wherein the braking switch is a relay having a first contact point where the braking switch switches to the normal position and a second contact point where the braking switch switches to the braking position.

9. The motor power supply control apparatus according to claim 3, wherein the braking switch is a relay having a first contact point where the braking switch switches to the normal position and a second contact point where the braking switch switches to the braking position.

10. The motor power supply control apparatus according to claim 4, wherein the braking switch is a relay having a first contact point where the braking switch switches to the normal position and a second contact point where the braking switch switches to the braking position.

11. A power supply including a DC supply control apparatus part having a pair of first terminals, and an inverter having a pair of second terminals, respectively, connectable to the pair of first terminals to supply AC power to a AC motor, the power supply comprising:
a switching element;
a wire connectable across the pair of the second terminals;
a braking resistor disposed in series with the switching element in the wire;
a braking switch disposed to connect one of the pair of the second terminals to one of a corresponding one of the first terminals, in a normal position of the braking switch and the wire, in a braking position of the braking switch;
a speed detector detecting a speed of the motor;
a control part controlling the braking switch to switch to the braking position and the switching element so that an on-off interval thereof depends on the speed detected by the speed detector, when the motor is in a dynamic braking mode; and
an over voltage protection resistor having a side connected between the braking resistor and the control switching element, and a remaining side connected to the one connection terminal to be placed in series with the control switching element.

12. A power supply control apparatus including a DC supply unit connected to an inverter to supply AC power to a motor, the power supply comprising:
a series of a switching element and a braking resistor connectable across input terminals of the inverter;
a braking switch disposed to connect one of the input terminals of the inverter to one of the DC supply unit, in a normal position of the braking switch and the series of the switching element and braking resistor;
a speed detector detecting a speed of the motor;
a control part controlling the braking switch and the switching element so that the braking switch is switched to the braking position and on-off interval of the switching element depends on the speed detected by the speed detector, when the motor is in a dynamic braking mode; and
an over voltage protection resistor having a side connected between the braking resistor and the control switching element, and a remaining side connected to the one connection terminal to be placed in series with the control switching element;
wherein the speed detector comprises:
an encoder coding an angle of a rotation position of the motor and calculating a rotation position and a speed of the AC motor based on an encoded signal, and providing the control part with information of the speed and the angle of the rotation position of the AC motor.

13. The power supply control apparatus according to claim 12, wherein, while the motor is in a driving mode, rotational energy stored by the motor regenerates in the DC supply unit through the inverter.

14. A power supply control apparatus including a DC supply unit connected to an inverter to supply AC power to a motor, the power supply comprising:
a series of a switching element and a braking resistor connectable across input terminals of the inverter;
a braking switch disposed to connect one of the input terminals of the inverter to one of the DC supply unit and the series;
a control part detecting the speed of the motor and controlling a switching interval of the switching element according to the detected speed; and
an over voltage protection resistor having a side connected between the braking resistor and the control switching element, and a remaining side connected to the one connection terminal to be placed in series with the control switching element.

15. The power supply control apparatus according to claim 14, further comprising:
an over voltage detector detecting an over voltage across output terminals of the DC supply unit, and
wherein the control part controls the braking switch to connect the respective one of the input terminals of the inverter to a respective one of the output terminals of the DC supply unit and turns the switching element on when the over voltage detector detects the over voltage across the output terminals of the DC supply unit.

16. The power supply control apparatus according to claim 15, further comprising:
a diode disposed, in parallel, with the over voltage protection resistor, having a cathode connected to the one input terminal of the inverter to which the over voltage protection resistor is connected.

17. The power supply control apparatus according to claim 14, wherein the control part controls the braking switch to switch to the DC supply unit when the motor is in a driving mode.

18. The power supply control apparatus according to claim 15, wherein a resistance value of the braking resistor is smaller than that of the over voltage protection resistor.

19. The power supply control apparatus according to claim 16, wherein a resistance value of the braking resistor is smaller than that of the over voltage protection resistor.

20. The power supply control apparatus according to claim 14, wherein the braking switch comprises:
a relay having a first contact point where the braking switch switches to the DC supply unit and a second contact point where the braking switch switches to the series of the braking resistor and the switching element.

21. The power supply control apparatus according to claim 15, wherein the braking switch comprises:
a relay having a first contact point where the braking switch switches to the DC supply unit and a second contact point where the braking switch switches to the series of the braking resistor and the switching element.

22. The power supply control apparatus according to claim 16, wherein the braking switch comprises:
a relay having a first contact point where the braking switch switches to the DC supply unit and a second contact point where the braking switch switches to the series of the braking resistor and the switching element.

23. The power supply control apparatus according to claim 14, further comprising:
an inrush-current protection circuit to prevent an inrush-current from being generated on an initial supply of power to the DC supply unit.

24. The power supply control apparatus according to claim 21, wherein:
the DC supply unit comprises:
a capacitor connected across the output terminals of the DC supply unit; and
the inrush-current protection circuit comprises:
an inrush-current protection resistor reducing the inrush-current into the DC supply unit, and
an inrush-current protection relay turned off so that a rectified voltage of the DC supply unit is transferable to the capacitor by passing through the inrush-current protection resistor, or turned on so that the rectified voltage is transferable to the capacitor without passing through the inrush-current protection resistor.

25. The power supply control apparatus according to claim 14, wherein:
the switching element comprises:
a MOS transistor or a field effect transistor and is switchable depending on a gate input signal; and
the control part controls the gate input signal to the switching element so as to turn on or turn off the switching element to change an interval between a turning on and a turning off of the switching element.

26. The power supply control apparatus according to claim 15, wherein, when the over voltage detector detects the over voltage across the output terminals of the DC supply unit, the control part keeping the braking switch connected to a first contact point to turn on the switching element and, when the over voltage detector detects no over voltage across the output terminals of the DC supply unit, the control part turning off the switching element so that current bypass the over voltage protection resistor.

27. The power supply control apparatus according to claim 26, wherein, if a voltage across the output terminals of the DC supply unit reaches a maximum limit, the control part keeping the braking switch connected to the first contact point and turning on the switching element to decrease the voltage across the output terminals of the DC supply unit.

28. The power supply control apparatus according to claim 27, wherein the control part controlling the switching element so that a variation of the voltage applied across the output terminals of the DC supply is limitable within a range and operates the switching element within the range to decrease a malfunctioning of the switching element due to noise.

29. The power supply control apparatus according to claim 26, wherein the control part connecting the braking switch to the second contact point when the motor makes a sudden stop or the motor stops driving when power is not applied.

30. The power supply control apparatus according to claim 14, wherein a portion of the current flowing in the motor flowing through a diode of the inverter and the braking resistor resulting in a shortening of the power connection terminals of the motor.

31. The power supply control apparatus according to claim 27, wherein, a turn-on time of the switching element is shorter, as the motor rotates faster, and, the turn-on time of the switching element is longer, as the motor rotates slower.

32. The power supply control apparatus according to claim 27, wherein, a duty ratio of the switching element decrease, as the speed of the motor increases, and, the duty ratio of the switching element increases, as the speed of the motor decreases.

33. The power supply control apparatus according to claim 14, wherein the motor is a single phase motor or a multi-phase motor.

* * * * *